July 14, 1959     E. P. PALMATIER     2,894,380
EVAPORATOR CONTROL FOR ABSORPTION REFRIGERATION SYSTEMS
Original Filed July 16, 1953     3 Sheets-Sheet 1

INVENTOR.
EVERETT P. PALMATIER
BY *Herman Said*
ATTORNEY

INVENTOR.
EVERETT P. PALMATIER
BY Herman Seid
ATTORNEY

July 14, 1959 — E. P. PALMATIER — 2,894,380
EVAPORATOR CONTROL FOR ABSORPTION REFRIGERATION SYSTEMS
Original Filed July 16, 1953 — 3 Sheets-Sheet 3

INVENTOR.
EVERETT P. PALMATIER
BY *Herman Seid*
ATTORNEY

United States Patent Office 2,894,380
Patented July 14, 1959

2,894,380

EVAPORATOR CONTROL FOR ABSORPTION REFRIGERATION SYSTEMS

Everett Perry Palmatier, Solvay, N.Y., assignor to Carrier Corporation, Syracuse, N.Y., a corporation of Delaware Original application July 16, 1953, Serial No. 368,355. Divided and this application November 1, 1954, Serial No. 466,064

9 Claims. (Cl. 62—476)

This application is a division of my copending application Serial No. 368,355, filed July 16, 1953, entitled "Evaporator Control for Absorption Refrigeration Systems," and relates generally to absorption refrigeration systems and more particularly to an arrangement for maintaining a desired pattern of refrigerant feed within the evaporator of the system so that liquid refrigerant at a predetermined rate is supplied to each tube of a multi-tube evaporator in such a manner as to ensure efficient distribution of the liquid refrigerant in the evaporator.

One type of absorption refrigeration system with which this invention may be used has a capacity of about 5 tons of refrigeration and may be employed with apparatus forming a heating and cooling system for an enclosure such as a residential home. Flow of liquid refrigerant in the system is of a very small order, such as about a pint per minute. Under such circumstances it is important that the amount of liquid refrigerant flowing into the evaporator from the condenser, when the system is operated to provide a cooling effect, be efficiently utilized. The particular evaporator structure involved includes a plurality of vertically spaced tubes connected at one end to an upper header and the other end to a lower header. Preferably the liquid refrigerant is introduced into the upper header from where it flows downwardly through the tubes in a film and is vaporized therein as it absorbs heat from the air from the enclosure as the air is passed over the evaporator unit by a fan or the like.

The flow of liquid refrigerant, usually water, downwardly through the tubes is of a very small order depending, in addition to the rate mentioned above, on the number of tubes forming the evaporator. In any event the amount of liquid flow in film form is so small that the refrigerant changes state in the evaporator through the phenomena of surface evaporation. It will be appreciated that those tubes in the entering air side of the evaporator will be in contact with the warmest air and the tubes lying downstream toward the leaving air side of the evaporator will each be subjected to cooler air. Therefore it is necessary to vary the amount of refrigerant flowing in each tube in accordance with the load as represented by the temperature of the air flowing over the tubes.

This invention is concerned with the adaptation to each tube of a device for regulating the flow of refrigerant to the tube in accordance with the design rate, which rate is of course determined in accordance with the conditions described above such as the position of the tube with respect to the air flow, and amount of liquid refrigerant available for distribution.

Accordingly, this invention has for its chief object the provision of a device adapted to be applied to each tube of a multi-tube evaporator unit for regulating the flow of liquid refrigerant to the tube.

A further object is the provision of a device of the kind under consideration wherein the vapor produced within the tube, as an exchange of heat occurs between the evaporator and the air to be conditioned, is utilized to regulate the flow of liquid refrigerant into the tube thereby preventing the tube from receiving an amount of refrigerant in excess of that desired.

A still further object is the provision of a flow regulating device wherein the vapor flow is controlled in such a manner as to store or circulate within the upper header quantities of liquid refrigerant in excess of that necessary to maintain the proper feed rate.

The invention relates to an evaporator feed control device including means to feed liquid refrigerant to the tube in desired amounts, the device being arranged so that vapor formed in the evaporator tube is used to regulate the supply of liquid to the tube. The desired regulation is preferably accomplished by providing each tube with a receptacle formed with a liquid accommodating reservoir and a passageway for the flow of vapor from the tube, the passageway being arranged in such a manner that the vapor flow therein induces a portion of the liquid in the reservoir to flow through a separate passage and be entrained in the vapor stream rather than to flow into the tube.

The invention also relates to a method of regulating the supply of liquid refrigerant to the tube of an evaporator wherein vapor formed within the evaporator tube is used to assist in the regulation of the supply.

Other objects and advantages of the invention will be apparent upon a consideration of the ensuing description wherein one embodiment of the invention is described, it being understood that the description is not to be considered as limiting the scope of the invention.

Figure 1:
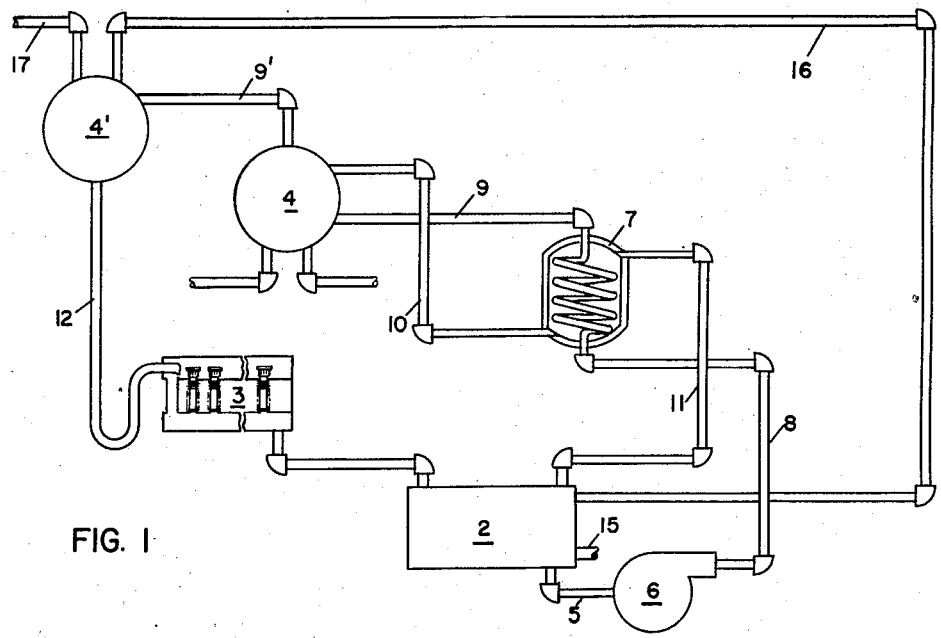
Figure 1 is a diagrammatic view of an absorption refrigeration system including the present invention.

Referring more particularly to the drawings, Figure 1 shows diagrammatically an absorption refrigeration system including an absorber 2, a solution pump 6 for transferring weak solution from the absorber to a heat exchange unit 7 through lines 5 and 8.

The term "weak solution" is here employed to describe a solution of a refrigerant such as water and an absorbing salt such as lithium bromide, which solution is rich in refrigerant so that its absorbing properties may be considered weak. The term "strong solution" here employed, refers to a solution, of the type described above, deficient in refrigerant so that its absorbing properties may be considered strong.

From the heat exchange unit the solution flows through line 9 to the generator 4 where a part of the water is boiled off and passes in the vapor phase through line 9' to the condenser 4'. Line 10 permits strong solution, remaining in the generator after the vaporous refrigerant has passed to the condenser, to pass to the heat exchange unit where it warms weak solution passing to the generator. Line 11 permits passage of the strong solution to the absorber 2 from the heat exchange unit 7.

The vaporous refrigerant passing to the condenser through line 9' is changed to the liquid state through the action of a cooling coil and is then forwarded to the evaporator 3 through line 12 which is provided with a looped portion designed to provide a pressure seal. Thus a two pressure system, wherein the evaporator and absorber are at one pressure and the generator and condenser at a higher pressure, is provided. From the evaporator, vaporous refrigerant passes to the absorber to be mixed with the strong solution returning from the generator, the heat of condensation, in this instance, being absorbed by a cooling coil in the absorber. After the strong solution is diluted as described, the resulting weak solution passes to the pump to complete the cycle. A cooling circuit including a coil in the condenser (not shown), line 16, a coil in the absorber (not shown), line 15, a cooling tower complete with pump (not shown) and line 17 from the cooling tower completes the refrigeration system.

Figure 2:
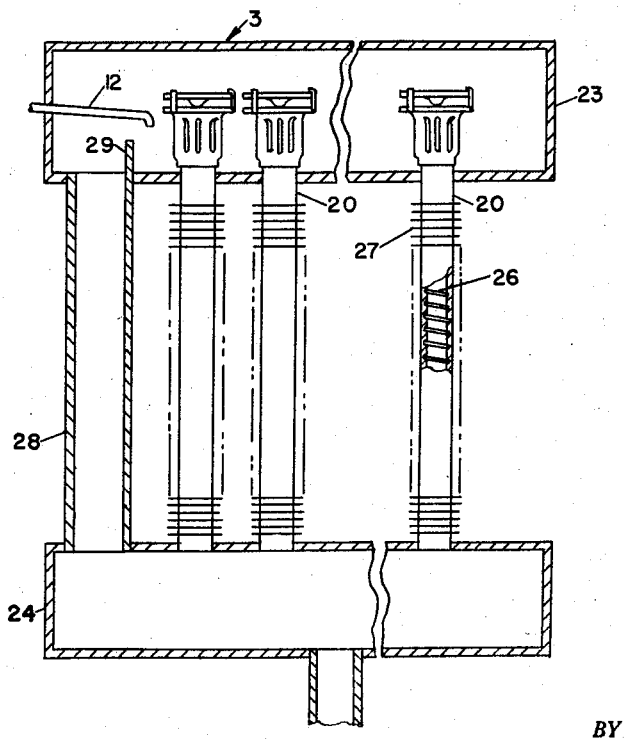
Figure 2 is a view partly in elevation and partly in section, of an evaporator unit equipped with the liquid flow regulating device of the invention.

The evaporator structure is shown in detail in Figure 2 wherein an upper header 23 and a lower header 24 are in communication with each other through a plurality of tubes 20 and a by-pass vapor line 28. Each tube is shown with its upper end projecting above the bottom of the upper vapor header and a feed regulating device applied to the projecting end. A baffle 29 is shown for preventing flow of liquid refrigerant into the vapor by-pass line. Each tube is provided on the inner surface thereof with a series of circumferential grooves 26 for ensuring adequate distribution of the liquid refrigerant over the inner surface of the tube. Fins 27 are assembled about the outer surface of the tube to assist in providing efficient heat transfer action. Liquid refrigerant enters the evaporator through line 12, and collects in the upper header.

In accordance with the invention, the amount of liquid feed necessary to provide a desired film of refrigerant on the inner surface of one of the tubes of the evaporator unit may be ascertained for a certain load under predetermined operating conditions.

Figure 3:
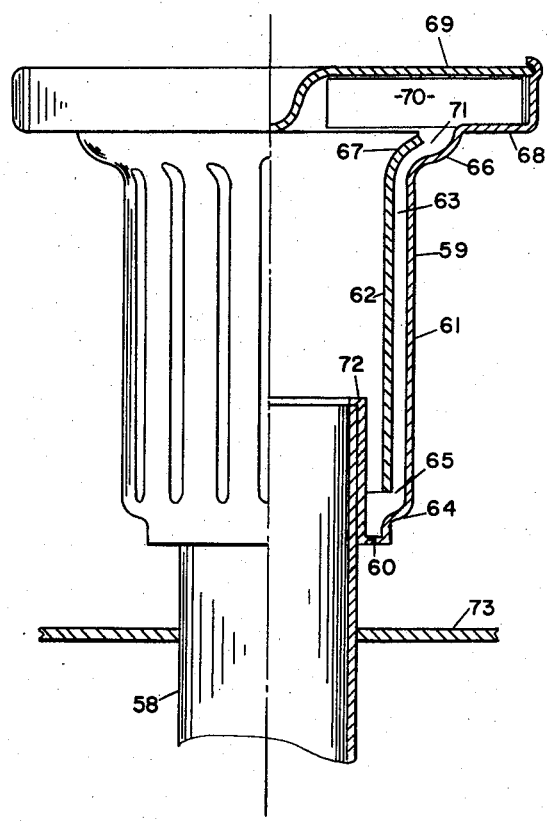
Figure 3 is a side view partly in elevation and partly in section, illustrating one form of the receptacle used to regulate the supply of liquid to an evaporator tube.

The device shown in Figure 3 is arranged to regulate the flow of liquid refrigerant from the upper header into the tube in the desired manner. Referring more particularly to the construction it will be noted that a regulating device of the type under consideration is applied to each tube. Disposed about an evaporator tube 58 is a feed control device 59, which has one or more feed holes or openings 60 spaced about the bottom thereof. The device 59 includes two substantially cylindrical portions 61 and 62 spaced from each other by protuberances preferably on the inner side of cylinder 61. This provides a multiplicity of passageways 63 between portions 61 and 62. It will be noted that the cylinder 62 is spaced at its lower end from the angular extension 64, which extends from the lower portion of cylinder 61, to form an opening 65 between extension 64 and cylinder 62.

The upper ends of cylinders 61 and 62 terminate in angular portions 66 and 67. A horizontal portion 68 extends from the angular portion 66. A top 69 is mounted above the horizontal portion 68 to provide a passage 70 therebetween. An opening 71 is formed between the spaced angular portions 66 and 67. The feed control device 59 is supported from the tube 58 by means of flanged member 72. The bottom of the refrigerant reservoir is indicated by member 73.

Liquid refrigerant enters through the feed hole 60 and fills up the portion of the device 59 surrounding the tube 58 until the level in the device 59 reaches the top of the tube 58 when liquid refrigerant begins to flow over the lip of the tube and wet the inner surface of the tube. The vapor generated from the liquid refrigerant being evaporated in tube 58 will flow upwardly through cylinder 62 to passage 70. The area of the passage 70 in the vicinity of opening 71 is smaller in cross section than the area of the tube 58 so that the velocity of the vapor in passage 70 is greater than in cylinder 62 and the static pressure in passage 70 is less than at the upper exit of tube 58. Therefore, this vapor will tend to cause the liquid to rise in passages 63 and be entrained with the vapor in passage 70 by escaping through the opening 71 formed between the portions 66 and 67 continuing on through an opening (not shown) to the vapor header. By selecting the area of passage 70 and the distance between the top of the tube 58 and the horizontal portion 68, the desired amount of flow of liquid refrigerant to the tube may be regulated.

Figure 4:
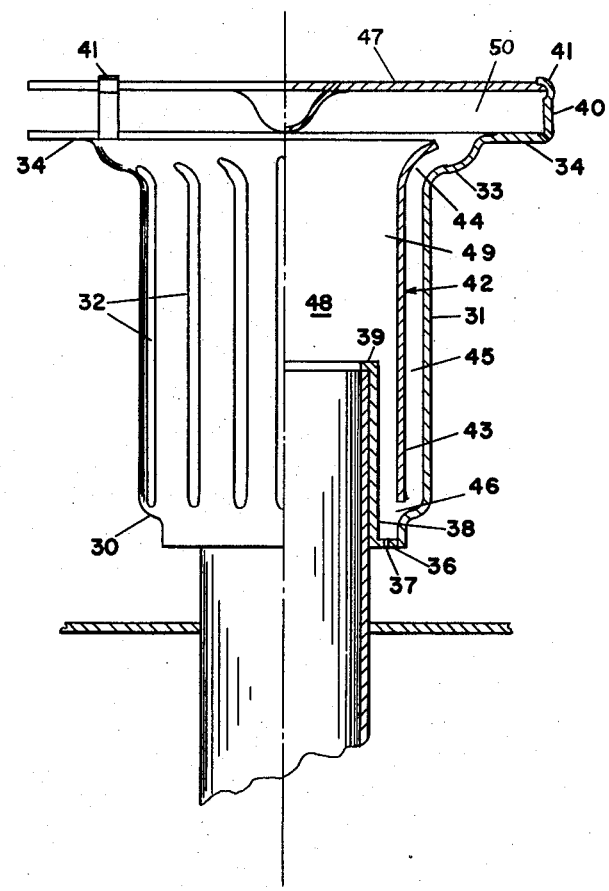
Figure 4 is a view similar to Figure 3 showing a modified form of the receptacle illustrated in Figure 3.

Figure 4 illustrates another form of the invention wherein an outer casing 30, similar to member 61, is provided with a substantially cylindrical central body portion 31 provided with a series of circumferentially spaced, axially extending grooves 32, and a flared end poriton 33 terminating in a substantially horizontal end portion 34. The casing is further formed with an inwardly extending foot 36 having spaced apertures 37 therein, and a tube engaging portion 38 extending axially of the casing and spaced inwardly of the body portion 31, the portion 38 terminating in a flange 39 adapted to engage the end of the tube to support the regulating device in suspended position thereon.

The material from which the casing is fabricated is preferably sheet metal so as to respond readily to conventional stamping and forming operations. Attached to the portion 34 at circumferentially spaced locations are a series of axially extending resilient tabs 40 having hooked end portions 41.

Assembled within the outer casing 30 is an inner member 42 having a substantially cylindrical portion 43 and a flared end portion 44 integrally connected thereto. The outer surface of the inner member may frictionally engage the projections formed by the grooves 32 or it may be secured to the projections by welding or some equivalent operation. When assembled in the manner described a series of chambers 45 similar to passages 63, are provided having a lower end, communicating with a reservoir 46 formed by the tube engaging foot and inclined portion of the casing, and an open upper end.

The regulating device is further provided with a cover 47 arranged to have spaced marginal portions frictionally engaged by the hooked end portions of the resilient tabs 40. Thus it will be noted that a series of outlets are formed in the top of the regulating device. The central portion of the cover is dished inwardly so that when assembled with the members 30 and 42 as shown in Figure 4 a passage 48 for the flow of vapor is provided. The passage is characterized by a first section 49 having a relatively large cross sectional area and a portion 50 the axis of which extends substantially normal to the axis of portion 49. The cross sectional area of the portion 50 is smaller than the cross sectional area of the section 49.

Considering the operation of the flow regulating device 59 or 30, once the refrigerating effect to be produced by each tube has been determined by considering the rate of refrigerant flow in the system, the amount of heat exchange desired, the vapor flow occurring in relation to the liquid refrigerant feed per tube, then the dimensions of the individual sections of the device are calculated so that the vapor flowing upwardly in the tube will be under a certain velocity and static pressure in the lower part of the passage, and because of reduced area of the upper part of the passage, be under a lower static pressure and higher velocity. The area of low pressure will be in communication with the upper opening of the chamber causing a part of the liquid in the reservoir to rise in the chamber and be entrained in the vapor emanating from the regulating device. The entrained liquid will then drop by gravity into the header and flow through openings 37 into the bottom of the reservoir from where it flows either downwardly through the tube to be vaporized therein or upwardly into the chamber defined by the inner and outer member.

It will be obvious that when the design conditions are fulfilled the flow of liquid refrigerant into the evaporator tube will be effectively controlled so that the level to which the refrigerant flows down the surface may be determined and minor leveling misalignments will only serve to cause the level to vary within minor limits.

Variations in the system operating conditions may be considered inconsequential once the design of the regulating device installed on the top of each evaporator tube is properly made and the proper solution concentration control means are provided in the cooperating absorption refrigeration system.

For example, if the load on the evaporator is reduced temporarily as a result of cooler air flowing over the outside of the tubes, the vapor flow through the feed control device will also reduce temporarily and an excess of refrigerant will flow into the tubes.

By means known to the art, this excess refrigerant, which will not evaporate and will run out the bottom of the evaporator tubes, is collected and segregated from the absorbent solution circulating system. This causes increased concentration of the solution in the system and particularly in the absorber. Lower pressure results in the evaporator and consequently an upward adjustment of the vapor flow rate from the evaporator tubes occurs until each tube is producing close to the design value. The refrigerant is then again properly divided between the various tubes of the evaporator as before.

It should be borne in mind that the small absorption units in which the disclosed device is used are essentially fixed capacity machines with the total quantity of refrigerant condensed and evaporated depending largely on the fixed amount of heat supplied to the generator component.

Summarizing, it will be evident that the flow in each tube will be controlled in part by the vapor flow which is directed in a manner to induce portions of the liquid to be entrained therewith. The degree of liquid entrainment by the vapor flow will of course be dependent upon the relative dimensions of the differential passageway 48. Thus a desired volume of liquid flow upwardly through the receptacle may be obtained by varying the dimensions of the passageway. Other structural arrangements may be employed in the practice of this invention without departing from the spirit of the invention. For example, the outer member 31 or 61 and the cover 69 or 47 may be formed from a piece of tubing, having one end closed and the openings, permitting the flow of vapor to emanate from the device, placed therein.

Although only two forms of the invention have been described it will be obvious that other structural arrangements illustrating the invention will suggest themselves to those skilled in the art without deviation from the spirit or scope of the invention as defined in the claims.

I claim:

1. A device for regulating the supply of liquid to an evaporator tube comprising an outer member supported from and surrounding the top of the tube, said outer member including an apertured portion disposed below the top of the tube serving as a reservoir for liquid refrigerant introduced through the aperture; an inner member assembled within the outer member and in spaced relation to portions of the outer member so as to form at least one passage in communication with the reservoir; and a cover mounted in spaced relation to the top of the outer member, and forming with the inner member, a passage for the flow of vapor from the tube, said passage having a first section in communication with the tube, and a second section having a cross-section smaller than the first section whereby vapor flowing in the second section induces a flow of liquid into the passage from the reservoir.

2. A receptacle for the supply of liquid refrigerant to an evaporator tube comprising an outer member having a base, an upwardly extending marginal wall, a tube engaging flange spaced from the base, a wall connecting the base and the flange, said base being provided with a series of openings for the introduction of liquid into the space defined by the walls; an inner member assembled in spaced relation to the marginal wall of the outer member to form a chamber therewith, said inner member terminating above the tube engaging flange; and a cover member mounted in spaced relation to the upper part of the outer member, the parts being arranged to provide a passage for vapor flow from the tube, said passage being characterized by a first section in axial alignment with the tube and a second section of reduced dimensions radiating from the first portion so that the velocity of the vapor flow is increased as it flows from the receptacle to induce the flow of liquid upwardly in the chamber.

3. A receptacle of the type described in claim 2 wherein said cover member is provided with a circumferentially interrupted skirt portion.

4. A receptacle of the type described in claim 2 wherein said outer member is provided with at least one extension for supporting the cover member.

5. A receptacle of the type described in claim 2 wherein the central portion of the cover is dished inwardly in the direction of the evaporator tube.

6. An absorption refrigeration system comprising a generator, a condenser, an absorber, an evaporator including a liquid refrigerant accumulating header and at least one evaporator tube, a solution pump for forwarding a solution of refrigerant and an absorbent to the generator from the absorber, conduits interconnecting the generator, condenser, absorber and evaporator whereby vaporous refrigerant formed in the generator is condensed and forwarded to the evaporator to be vaporized therein from where it flows to the absorber to be absorbed by the solution returning from the generator to complete the refrigeration cycle, and means for controlling the flow of liquid refrigerant to the evaporator tube, said means including a tube engaging member having an apertured reservoir extending below the liquid level in the evaporator header and a passageway extending upwardly from the tube so arranged to cause vaporous refrigerant to entrain from the reservoir, quantities of liquid refrigerant in excess of a predetermined amount.

7. A device for regulating flow of liquid into an evaporator tube of a refrigeration system to be vaporized therein comprising a substantially cylindrical reservoir-defining member arranged to surround the top of an evaporator tube, liquid over-flowing from said reservoir into said evaporator tube, said member having at least one opening below the level of the top of the tube for the admission of liquid refrigerant, a second substantially cylindrical member arranged within the first cylindrical member with spaced portions thereof engaging the first cylinder to form at least one passageway for the induced flow of liquid refrigerant for return to the absorber, said induced flow being under the influence of a flow of vapor from the evaporator tube in excess of an amount indicative of a predetermined liquid refrigerant feed into the tube.

8. A device for regulating flow of liquid into an evaporator tube of a refrigeration system to be vaporized therein comprising a substantially cylindrical reservoir-defining member arranged to surround the top of an evaporator tube, liquid over-flowing from said reservoir into said evaporator tube, said member having at least one opening below the level of the top of the tube for the admission of liquid refrigerant, a member having a wall portion forming with the reservoir-defining member a passageway for the induced flow of liquid refrigerant for return to the absorber, said induced flow being under the influence of a flow of vapor from the evaporator tube in excess of an amount indicative of a predetermined liquid refrigerant feed into the tube.

9. A device for regulating the flow of liquid into an evaporator tube of a refrigeration system to be vaporized therein comprising means for accumulating a quantity of liquid adjacent the top of the tube so that the liquid spills over the top of the tube, and means utilizing vaporous refrigerant formed in the tube for diverting from the accumulated liquid a quantity of the liquid in excess of an amount required to maintain a desired rate of flow, said last mentioned means including a receiver provided with a differential passage for the flow of vapors from the tube.

References Cited in the file of this patent

UNITED STATES PATENTS

| | | |
|---|---|---|
| 2,408,480 | Reid | Oct. 1, 1946 |
| 2,465,904 | McNeely | Mar. 29, 1949 |
| 2,563,574 | Berry | Aug. 7, 1951 |
| 2,740,263 | Kritzer | Apr. 3, 1956 |